Dec. 31, 1957 S. HILLER, JR 2,818,123
ROTARY WING AIRCRAFT
Filed June 23, 1955 4 Sheets-Sheet 1
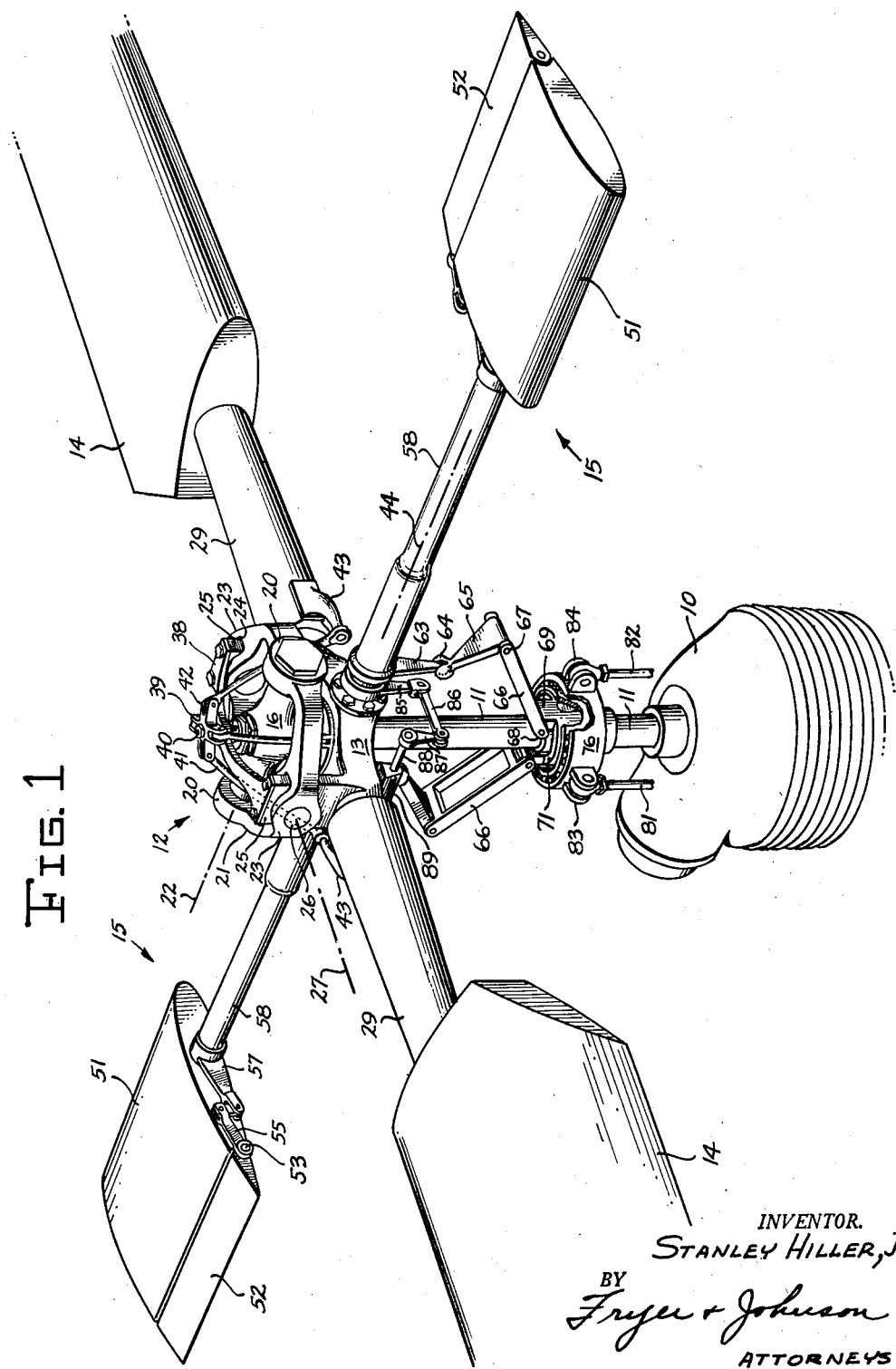
INVENTOR.
STANLEY HILLER, JR.
BY
Fryer + Johnson
ATTORNEYS.

Dec. 31, 1957   S. HILLER, JR   2,818,123
ROTARY WING AIRCRAFT
Filed June 23, 1955   4 Sheets-Sheet 2
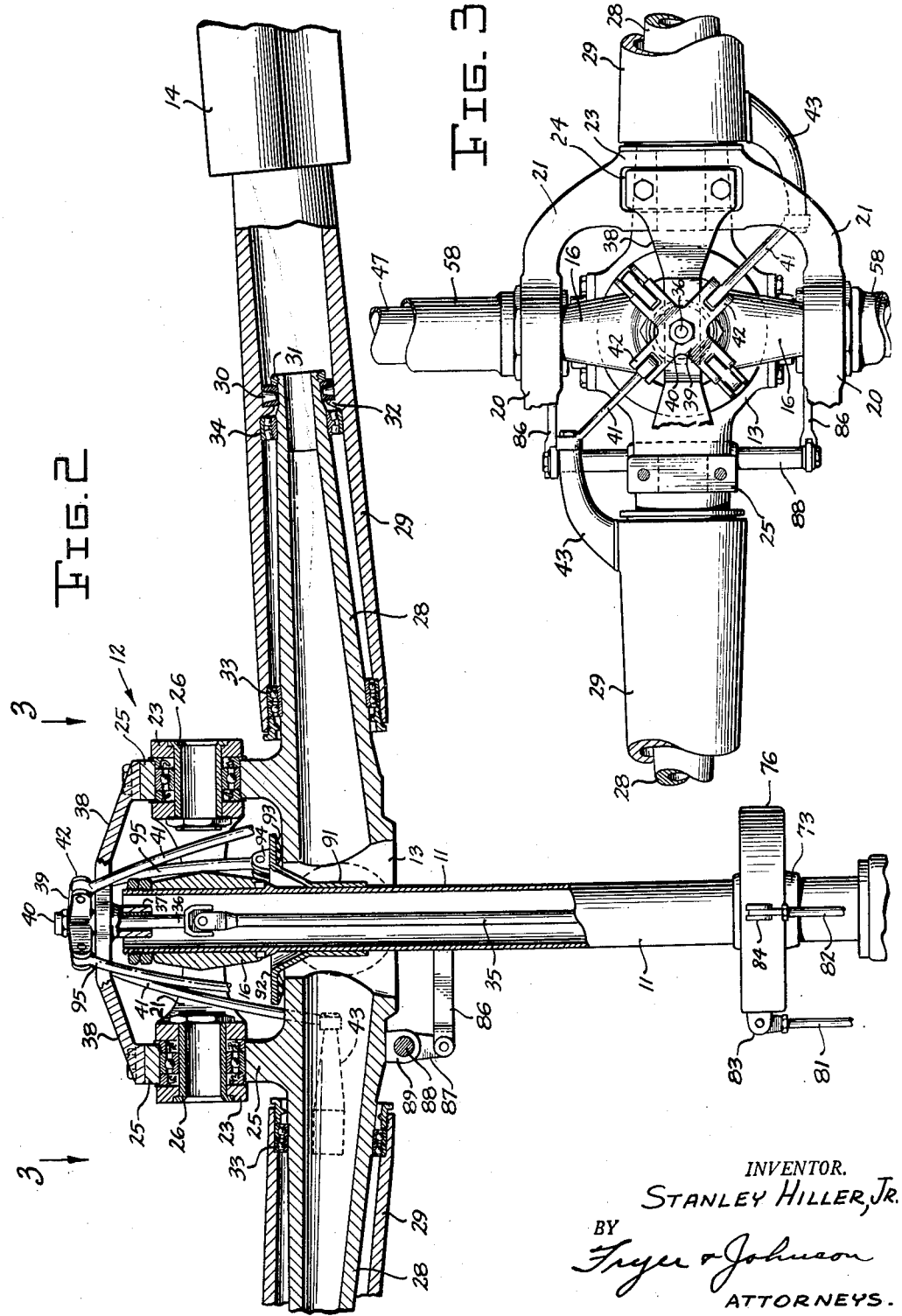
INVENTOR.
STANLEY HILLER, JR.
BY
Fryer & Johnson
ATTORNEYS.

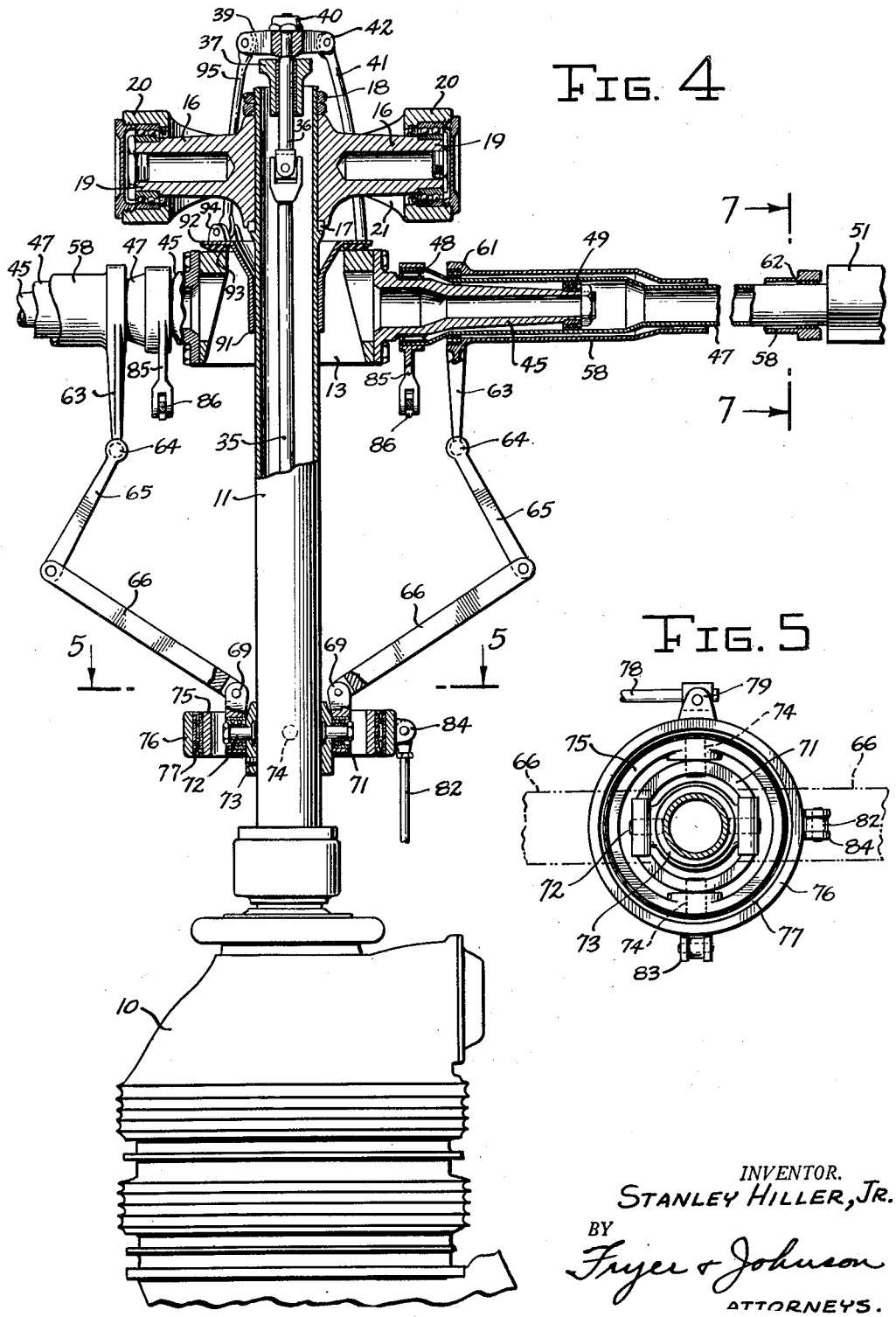

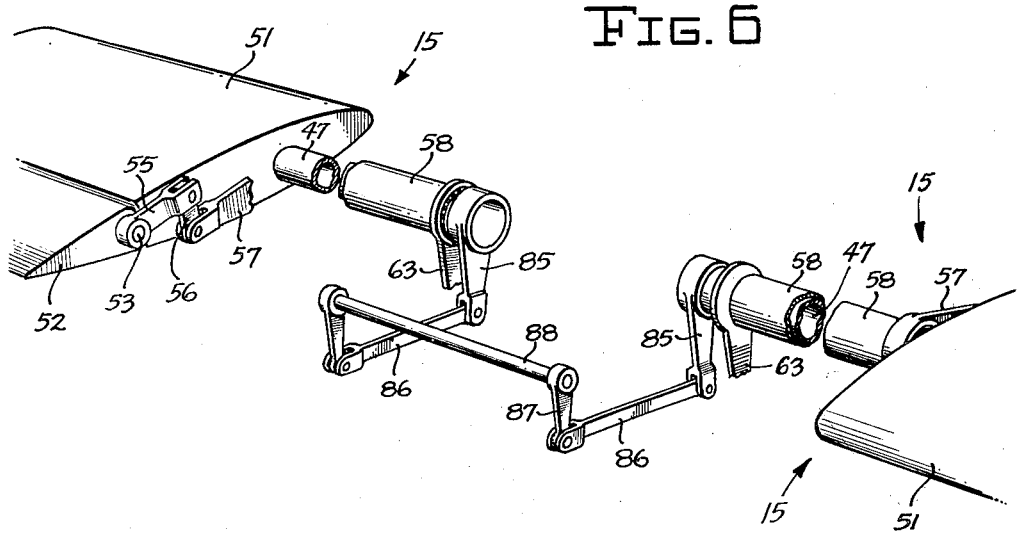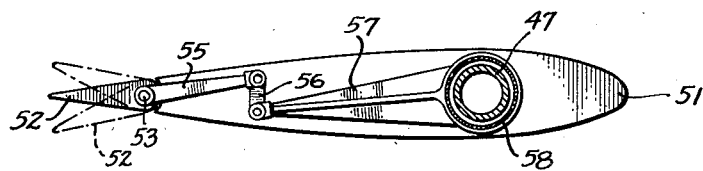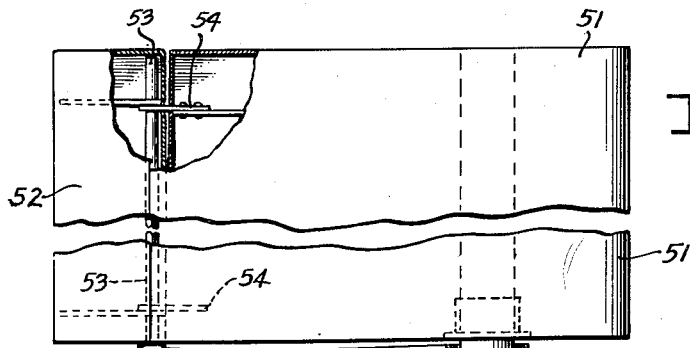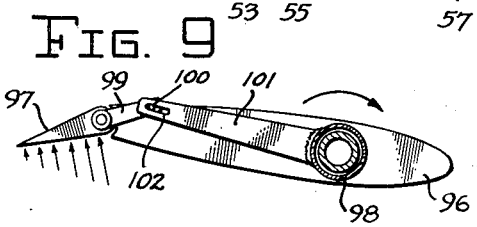

United States Patent Office 2,818,123
Patented Dec. 31, 1957

2,818,123

ROTARY WING AIRCRAFT

Stanley Hiller, Jr., Atherton, Calif., assignor to Hiller Helicopters, Palo Alto, Calif., a corporation of California Application June 23, 1955, Serial No. 517,507

6 Claims. (Cl. 170—160.25)

This invention relates to rotary wing aircraft such as helicopters and pertains more particularly to an improved helicopter rotor control means of the general type disclosed in assignee's U. S. Patent No. 2,534,353, dated December 19, 1950, wherein a control blade or paddle is provided to produce and control aerodynamically the oscillatory cyclic pitch of a lift wing.

As is explained in the specification of the above mentioned patent, it is desirable to provide indirect control to the main lift wings, not merely to prevent the feedback of forces from the lift rotor into the control system so as to achieve ease of control by the pilot, but also to provide a slower rate of response to the pilot's controls. The latter produces favorable effects on the stability of the machine since the pilot is provided with ample time to make the necessary control adjustments and thus prevent the machine from getting out of control. The reduction of stick forces also achieved by such an arrangement is highly desirable.

In the smaller and even moderate sizes of helicopters it has been found adequate to arrange the control systems so that the pilot's control stick is directly connected mechanically through a swash or wobble plate mechanism to relatively small control blades which in turn aerodynamically govern the cyclic pitch adjustment of the main lift wings. However, in very large helicopters, the control blades themselves become so large that direct pilot control imposes greater stick forces on the pilot.

Summarizing this invention, it is designed to overcome the problem of increased stick forces particularly in large helicopters having a control system of the character related, although the invention is also applicable to smaller helicopters. This is accomplished by indirectly controlling through aerodynamic means, the cyclic pitch of the control blades.

Therefore, a principal object of this invention is to provide a control system which employs a servo tab control to actuate aerodynamically a control blade which in turn controls a main lift wing; the servo tab control being directly connected mechanically to the pilot's control stick through the wobble plate or in other words cyclic pitch control mechanism.

A further object of the invention is to provide a control system adapted particularly for relatively large helicopters, which will provide light control stick forces without resorting to power boost controls.

Another object of this invention is to provide a helicopter control system having a pair of servo-tab-controlled control blades which are mechanically interconnected so as to equalize their respective amounts of pitchwise rotation as caused by the aerodynamic servo tabs mounted thereon.

These and other objects and advantages will be apparent from the following description and the accompanying drawings, wherein:

Fig. 1 is a partially schematic isometric view of a helicopter rotor head assembly embodying the principles of this invention;

Fig. 2 is a sectional view, partially in elevation, of the rotor head structure which supports the lifting rotor of the helicopter;

Fig. 3 is a fragmentary top view of the rotor head structure as viewed in the direction of the arrows 3—3 in Fig. 2; parts being broken away to illustrate the construction more clearly;

Fig. 4 is a sectional view, partially in elevation, of the rotor head structure as viewed at a right angle to that shown in Fig. 2;

Fig. 5 is a horizontal sectional view taken in a plane indicated by the line 5—5 of Fig. 4;

Fig. 6 is a fragmentary isometric view of the linkage mechanism which interconnects the two control blade structures;

Fig. 7 is a sectional view taken in a plane indicated by the line 7—7 of Fig. 4;

Fig. 8 is a fragmentary top plan view, partially broken away and in section, of one of the control blade structures;

Fig. 9 is a view similar to Fig. 7, but showing a modified lever arrangement for adjustment of the servo tab control, and also showing how air forces upon a deflected servo tab control effect cyclic pitch control of a control blade.

The rotor head structure illustrated in Fig. 1 is of the type shown in the aforementioned Patent 2,534,353, and is mounted atop the main body or fuselage section of a helicopter. The rotor may be power driven either from an engine located below in the craft's fuselage, or it may be powered by a propulsive means such as ram jets, for example, located at the tip portions of the main lift rotor wings. The present invention embodying an improved system of control is equally applicable irrespective of which of these two types of propulsion is utilized.

In the overall arrangement illustrated in Fig. 1, gear box 10 containing reduction gearing driven from an engine (not shown), provides a support housing which is affixed to the helicopter's fuselage structure (not shown), and within which the lower end of a wing supporting column in the form of rotor shaft 11, is journalled. The upper end of rotor shaft 11 carries a gimbal-like mounting means 12 which provides universal support for a lift wing structure having a rotor hub 13 upon which is mounted a pair of lift wings 14 which form the lift rotor. Hub 13 of the lift wing structure also supports a pair of control blade structures 15 which form the control rotor. The control rotor provides substantially no material lift insofar as support of the aircraft is concerned.

Universal mounting means 12 which is employed to support the rotor hub 13 comprises a double-ended support head 16 (Figs. 1 and 4) secured to the upper end of rotor shaft 11 by means of key splines 17 and lock nuts 18; support head 16 having a pair of opposite trunnions 19 which are journalled in a pair of diametrically opposed bosses 20 of a gimbal ring 31. Trunnions 19 provide for end to end tilting or flapping of the entire lift wing structure about a flapping axis 22 which is transverse to its span length. Gimbal ring 21 is provided with a second set of bosses 23 diametrically at a right angle to the first set of bosses 20. A vertical slot or aperture 24 (Fig. 3) is provided in each of the gimbal ring bosses 23 for the purpose of receiving upwardly projecting hub ears 25 of rotor hub 13; hub ears 25 being located at opposite sides of the rotor shaft 11. Pivot bolts 26 pivotally connect gimbal ring 21 to the two hub ears 25, thus providing for pitch adjustment of the entire lift wing structure about an axis 27 which lies along the longitudinal or spanwise direction thereof, and is transverse to the flapping axis 22.

Rotor hub 13 is provided with a pair of diametrically opposite tapered stub shafts 28 (Fig. 2) upon which lift wing support sleeves 29 are journalled for controlled collective pitch adjustment of the lift wings 14 by control means to be hereinafter described. Stub shafts 28 are provided with axial thrust bearings 30 and bearing retainer nuts 31 for absorbing the centrifugal rotor forces which are transmitted through internal annular flanges 32 on the wing support sleeves 29. In addition, a pair of radial thrust bearings 33 and 34 is provided to absorb the normal forces between stub shafts 28 and the support sleeves 29, and to provide journalling of lift wings 14 for collective pitch adjustment about their longitudinal axes.

Such collective pitch adjustment is used to govern the helicopter's rate of ascent and descent, and is controlled by an independent pilot-controlled linkage system comprising an axially movable control rod 35 centrally located within hollow rotor shaft 11, and having at its upper end a short universally connected stem rod 36 supported for axial movement in a guide sleeve 37 which forms the central portion of a support bridge 38 bolted at its respective ends to the top portions of hub ears 25. The uppermost end of the stem rod 36 is provided with an attached spider-like crosshead 39 secured thereon by a nut 40. A pair of link rods 41 pivotally connected at their upper ends to radially extending lugs 42 of the crosshead 39, and ball-jointedly connected at their lower ends to wing sleeve levers 43, functions to convert axial motion of the control rod 35 into rotary motion of the lift wing sleeves 29, and thus impart collective pitch adjustment to the lift wings 14. It is to be noted (Fig. 1) that the wing sleeve levers 43 which are secured to the wing sleeves 29 are both located on the "leading edge" sides of their respective lift wing sleeves 29 so that when a collective pitch adjustment is made, both lift wings 14 will increase or decrease pitch simultaneously even though their actual rotations are opposite to one another.

In the embodiment illustrated (Figs. 1 and 4), the control rotor comprises similar opposite control blade structures 15 each supported by a support shaft 45 which is secured to the rotor hub 13 on an axis 44 transversely at a right angle to the spanwise direction of the lift wing pitch adjustment axis 27. Supported on the shaft 45 for rotative adjustment movement thereabout is a support sleeve 47 journalled thereon by respective spaced bearings 48 and 49, and carrying at its outer end a main control blade 51. As will be described in more detail hereinafter, rotative pitch adjustment of each control blade 51 is effected in flight by aerodynamic forces resulting from pilot controlled deflection of a servo tab control 52 which is pivotally mounted upon the trailing edge portion of the control blade 51.

Each servo tab control 52 is provided with a fixedly mounted pivot shaft 53 journalled in internal hinge brackets 54 (Fig. 8) fixedly supported by the associated control blade 51. Upon the projecting inner end of each shaft 53 is fixedly secured an adjusting lever 55 pivotally connected to a link 56 in turn pivotally connected to a lever 57 which is fixedly secured to the outer end of an external torque tube 58 journalled around the support sleeve 47 by means of bearings 61 and 62.

To control the rotative adjustment of each torque tube 58 about its longitudinal axis 44 and thereby control a deflection of the servo tab 52 through the linkage previously described, there is secured to the inner end of the torque tube 58 a depending lever arm 63 which is connected by a ball and socket joint 64 to the upper end of an elbow-like "scissors" linkage having a pair of inter-pivoted beam links 65 and 66 connected together by a pivot pin 67. The lower end of the scissors linkage, namely, the lower and inner end of the beam link 66, is provided with a pair of spaced apart ears 68 pivotally connected to the opposite ends of an upstanding lug 69 on the inner gimbal ring 71 of a universally mounted wobble mechanism.

Inner gimbal ring 71 of the wobble mechanism is journalled on diametrically opposite trunnions 72 (Figs. 4 and 5) of a hub 73 which is fixedly secured to rotor column 11 for rotation therewith. Immediately surrounding inner gimbal ring 71 is an outer gimbal ring 75 having a pair of diametrically opposite trunnions 74 for providing pivotal support upon inner gimbal ring 71 about an axis which lies at a right angle to the axis of trunnions 72. Outer gimbal ring 75 is coaxially journalled in a tiltable non-rotating external control ring 76 by means of bearings 77. External control ring 76 is prevented from rotating with respect to the rest of the rotor system by means of a stay rod 78 (Fig. 5) having one end thereof universally attached at 79 to the control ring 76, and having its opposite end similarly mounted to a fixed point on the helicopter's fuselage structure (not shown).

However, by reason of its universal support by the described gimbal ring mounting, external control ring 76 is tiltable in any azimuth direction, and is connected through a linkage system to the pilot's control stick (not shown) in such a manner that it may thereby be controlled for such universal tilting. This pilot controlled tilting adjustment is accomplished through a linkage which consists, in part, of a pair of push-pull rods 81 and 82 (Fig. 1) universally connected to radially projecting ears 83 and 84 respectively on the control ring 76. Such push-pull rods 81 and 82 are inter-linked to the pilot's control stick and are radially spaced apart 90° so as to enable tilting adjustment of the wobble mechanism in any azimuth direction for the purpose of effecting a corresponding directional control of the helicopter. The arrangement is such that when the wobble mechanism is tilted towards the rearward direction (rear side of control ring 76 lowered) the plane of rotation of the wing rotor will tilt forwardly and provide a component of thrust in that direction.

When non-rotating control ring 76 is tilted by the pilot, and as the inner gimbal ring 71 rotates with rest of the rotor system, a cyclic to and fro tilting motion is imparted to the inner gimbal ring 71. Such cyclic tilting motion of the inner gimbal ring 71 is transmitted to the two beam-links 65 and 66 of each of the pairs of scissors linkage as a to and fro swaying motion which in turn imparts an oscillatory rotative adjustment of a torque tube 58 which controls the associated servo tab 52.

From the above, it will be noted that the pilot-controlled wobble mechanism is connected to the control rotor structure in such a manner as to effect a cyclic up and down deflection of each of the servo tab controls 52 when the wobble mechanism is put in a tilted position and the rotor structure is rotating about the axis of the rotor shaft 11. The cyclically controlled up and down deflections of the servo tab controls 52 will, by means of aerodynamic forces, cause the cyclic pitch adjustment of the two rotor control blades 51 about the axis 44. In turn, cyclic pitch adjustment of the control blades 51 results in flapping of the entire control rotor about axis 27. Since axis 27 is also the cyclic pitch adjustment axis of the main rotor blades 14, the cyclic pitch imparted to the main rotor will result in flapping of the main rotor about axis 22 for directional control of the ship. This type of aerodynamic control imparted to the main rotor blades 14 is explained in greater detail in the aforementioned Patent 2,534,353, and also in assignee's Patent 2,481,750, dated September 13, 1949.

Since the pitch adjustment of each of control blades 51 is accomplished by aerodynamic forces, through a tab independently pivoted thereon, the two control blades 51 are desirably mechanically interconnected so as to insure equal amounts of pitchwise rotation of the two control blades 51, and thus insure that in forward flight when a retreating control blade 51 is operating at a relatively low resultant tip speed, it will be controlled by the advancing control blade 51 which is operating at a relatively high resultant tip speed. This mechanical interconnection is accomplished by having the respective inner ends of the control blade support sleeves 47 each provided with a depending lever arm 85 fixedly secured thereto. These lever arms 85, as is shown in Fig. 6, are pivoted at their lower ends to links 86 which are in turn pivotally connected to depending cranks 87 fixedly secured to opposite ends of a cross shaft 88. Cross shaft 88 is journalled in a depending support hanger 89 affixed to the underside of the rotor hub 13. However, the interconnection between the control rotor blades 51, although desirable for preciseness in equalizing pitch adjustment of the blades, is not essential.

With the above described linkage mechanism interconnecting the two control blades 51, the rotation of one blade will be transmitted to the other (and vice versa) and with the same rotational direction. However, because of the geometrical configuration of the parts, one control blade 51 will be pitching upwardly while the opposite blade will be pitching downwardly. This motion is consistent with the controlled deflections of the respective servo tab controls 52 which are mounted thereon.

In the embodiment of the invention shown, an auxiliary device for non-flight purposes only is employed to provide a rotor stop, and comprises a sleeve 91 slidably mounted upon a portion of the rotor shaft 11 for axial movement thereon. Sleeve 91 is provided at its upper end with an annular flange 92 having a non-metallic pressure pad 93 of rubber or the like secured to its under surface. The upper surface of the annular flange 92 is provided with two sets of paired lugs 94 which are pivoted to the lower ends of a pair of pressure rods 95. The upper ends of the pressure rods 95 are pivoted to the crosshead 39 which is connected, as previously described, to the stem rod 36 of axially movable collective pitch control rod 35.

When the helicopter is parked on the ground with its rotor system not being driven, collective pitch control rod 35 may be urged axially downward by its control mechanism (not shown), to thus firmly seat the pressure pad 93 upon the upper surface of the rotor hub 13, thus dampening small oscillatory movements of the rotor system as might be caused by gusts of wind or stray air currents.

In the modification of Fig. 9, a control blade 96 having a servo tab control 97 is functionally identical to the previously described control blade 51 and servo tab control 52, but is provided with a slightly modified form of linkage for transmitting the cyclic rotative adjustment of the torque tube 98 (corresponding to tube 58) into cyclic deflections of the servo tab control 97. The servo tab control 97 is pivoted in the manner described at the trailing edge of control blade 96, and is provided with a fixedly attached crank 99 having a crank pin 100 which is adapted to be actuated directly by up and down movement of a lever 101 which is fixedly secured to torque tube 98 for rotative adjustment therewith. A slot 102 is provided in the outer end of the lever 101 to receive and confine the crank pin 100 for accommodating its inherent sliding motion relative to the lever 101.

Fig. 9 also shows by means of the grouped arrows how a deflected servo tab control 97 will receive an air loading to thus effect the pitch adjustment of the control blade 96 as a whole.

With reference to the previously mentioned U. S. Patent No. 2,534,353, it should be noted that the embodiment and arrangement of components of the present invention also incorporates a feed back effect produced by spacing the pitch adjustment axis 44 of the control blades 51 below the tilting or flapping axis 22 of the main lift wings 14. As is explained in detail in the above mentioned patent, the consequent flapping or tilt adjustment of the lift wing structure acts to feed back a "reversing" effect into the control system which had initially caused the tilt, so as to automatically diminish or completely nullify the original control adjustment after the desired wing rotor tilt is achieved. Equilibrium is thus renewed but in a new attitude of flight. It is to be understood, however, that the feed back arrangement is not necessary to this invention, as the servo tabs may be employed in the arrangement shown in assignee's U. S. Patent 2,481,750, wherein the lift wing flapping and cyclic pitch axes, and the control blade pitch adjustment axis are all in substantially the same plane.

I claim:

1. In a rotary wing aircraft, a lift wing supporting column, a pair of opposed lift wings, a structure for mounting said lift wings on said column for rotation about the axis of the column and for pitch adjustment about a first axis extending longitudinally of the lift wings and for flapping of the lift wings about a second axis extending transversely with respect to said first axis, a pair of opposed control blades mounted on said lift wing mounting structure for pitch adjustment about a third axis extending longitudinally of said control blades and transversely with respect to said first axis, a servo tab pivotally mounted on the trailing edge of each of said control blades for effecting said pitch adjustment of said control blades through aerodynamic action, means for simultaneously deflecting said servo tabs including a pilot controlled wobble mechanism and a linkage connection between said wobble mechanism and each of said servo tabs, and a linkage interconnecting said control blades for equalizing their movements.

2. The aircraft of claim 1 in which the linkage interconnecting said control blades includes a shaft journalled on said lift wing mounting structure.

3. The aircraft of claim 1 in which each of the control blades is mounted on a first shaft journalled on said lift wing mounting structure, the linkage connection between said wobble mechanism and each of said servo tabs includes a second shaft journalled for rotation about the axis of each first shaft, and the linkage interconnecting said control blades includes a third shaft journalled on said lift wing mounting structure.

4. The combination with a rotary wing aircraft having a plurality of main rotor blades and a plurality of control rotor blades for said main rotor blades, and means mounting said main rotor and control blades for both flapping and pitch adjustment and interconnecting said main rotor and control blades to effect by aerodynamic action pitch adjustment and ultimate flapping of the main rotor blades upon pitch adjustment of said control blades, of control means for effecting pitch adjustment of the control blades comprising a control tab movably mounted at the trailing edge of each of said control blades, means for simultaneously moving said control tabs including a pilot controlled wobble mechanism and a linkage connection between said wobble mechanism and each of said control tabs, and linkage means interconnecting all of said control blades for equalizing their movements.

5. The combination with a rotary wing aircraft having a pair of opposed main rotor blades and a pair of opposed control rotor blades for said main rotor blades, and means mounting said main rotor and control blades for both flapping and pitch adjustment and interconnecting said main rotor and control blades to effect by aerodynamic action pitch adjustment and ultimate flapping of said main rotor blades upon pitch adjustment of said control blades, of control means for effecting pitch adjustment of the control blades comprising a control tab movably mounted at the trailing edge of each of said control blades, means for simultaneously moving said control tabs including a pilot controlled wobble mechanism and a linkage connection between said wobble mechanism and each of said control tabs; and means interconnecting said control blades for equalizing their movements comprising a generally horizontally extending shaft journalled on said blade mounting means and extending substantially parallel to the axes of said control blades, and linkage means connected between each control blade and said generally horizontally extending shaft.

6. The aircraft of claim 5 in which each of the control blades is carried by a first shaft journalled on said blade mounting means, and the linkage connection between each control tab and said wobble mechanism includes a second shaft journalled for rotation about the axis of each first shaft.

References Cited in the file of this patent

UNITED STATES PATENTS

| | | |
|---|---|---|
| 1,909,450 | Bleecker | May 16, 1933 |
| 2,497,465 | Mullin | Feb. 14, 1950 |
| 2,534,353 | Hiller et al. | Dec. 19, 1950 |
| 2,581,773 | Stalker | Jan. 8, 1952 |
| 2,642,143 | Miller | June 16, 1953 |